US012634339B2

(12) United States Patent
Woodworth et al.

(10) Patent No.: US 12,634,339 B2
(45) Date of Patent: May 19, 2026

(54) SYSTEMS AND METHODS FOR PROTECTION OF AUTHORITATIVE NAME SERVERS

(71) Applicant: Level 3 Communications, LLC, Broomfield, CO (US)

(72) Inventors: John R.B. Woodworth, Amissville, VA (US); Dean Ballew, Sterling, VA (US); Carol D. Lovell, West Monroe, LA (US); Dan Luther, Claremore, OK (US); James C. Anders, Lee's Summit, MO (US); Lisa Lamanna, Harrisonburg, VA (US)

(73) Assignee: Level 3 Communications, LLC, Denver, CO (US)

( * ) Notice: Subject to any disclaimer, the term of this patent is extended or adjusted under 35 U.S.C. 154(b) by 257 days.

(21) Appl. No.: 18/531,112

(22) Filed: Dec. 6, 2023

(65) Prior Publication Data

US 2024/0187447 A1 Jun. 6, 2024

Related U.S. Application Data

(60) Provisional application No. 63/430,572, filed on Dec. 6, 2022.

(51) Int. Cl.
*H04L 29/06* (2006.01)
*H04L 9/40* (2022.01)
(52) U.S. Cl.
CPC ...... *H04L 63/1458* (2013.01); *H04L 63/1425* (2013.01); *H04L 63/20* (2013.01)

(58) Field of Classification Search
CPC .. H04L 63/1425; H04L 63/1458; H04L 63/20
See application file for complete search history.

(56) References Cited

U.S. PATENT DOCUMENTS

| | | | | |
|---|---|---|---|---|
| 2018/0351976 A1* | 12/2018 | Shitrit-Efergan | ... | H04L 63/1425 |
| 2021/0152555 A1* | 5/2021 | Djosic | .................... | G06N 20/00 |
| 2024/0171606 A1* | 5/2024 | Bjarnason | ........... | H04L 63/1416 |

OTHER PUBLICATIONS

International Search Report and Written Opinion of the International Searching Authority, dated Mar. 27, 2024, Int'l Appl. No. PCT/US2023/082720, Int'l Filing Date Dec. 6, 2023; 11 pgs.
Hasegawa, Keita et al., "FQDN-Based Whitelist Filter on a DNS Cache Server Against the DNS Water Torture Attack", 2021 IFIP/IEEE International Symposium on Integrated Network Management (IM): Poster Sessions May 17, 2021, pp. 628-632.
Schomp, Kyle et al., "Akamai DNS: Providing Authoritative Answers to the World's Queries", Proceedings of the Annual Conference of the ACM Special Interest Group on Data Communication on the Applications, Technologies, Architectures, and Protocols for Computer Communication, ACMPUB27, New York, NY USA Jul. 30, 2020, pp. 465-478.

* cited by examiner

*Primary Examiner* — Jeffrey C Pwu
*Assistant Examiner* — Thong P Truong

(57) ABSTRACT

In a network, Domain Name Service (DNS) queries may be handled by one or more resolvers and one or more authoritative name servers. If a DNS distributed denial of service attack is launched against the network, it may degrade the performance of the authoritative name servers. As such, systems and methods for protection of authoritative name servers are provided.

19 Claims, 6 Drawing Sheets

200 — Receive a first domain name service (DNS) query for a first domain

202 — Determine that the first domain is within a first group of domains

204 — Forward the first DNS query to an authoritative name server

206 — Receive, from the authoritative name server, an NXDOMAIN response code

208 — Determine that the first domain does not exist

210 — Transition to a partially disabled state, for the first group

212 — Request a list of valid domains in the first group and a list of corresponding IP addresses 214 — Update a cache of valid domains 216 — Increment a counter associated with the first group 218 — Receive, in the partially disabled state, a second DNS query, for a third domain 220 — Determine that the third domain is within the first group 222 — Treat, the third domain as unavailable in responding to the second DNS query

FIG. 2A

Receive a first counter value, from a first resolver — 250

Receive a second counter value, from a second resolver — 252

Determine that a transition criterion has been met — 254

In response to determining that the transition criterion has been met, instructing the first resolver and the second resolver to synchronize their caches and transition to a partially disabled state — 256

SYSTEMS AND METHODS FOR PROTECTION OF AUTHORITATIVE NAME SERVERS

CROSS-REFERENCE TO RELATED APPLICATIONS

This application claims the benefit of U.S. Provisional Application No. 63/430,572 filed Dec. 6, 2022, entitled "Systems and Methods for Protection of Authoritative Name Servers," which is incorporated herein by reference in its entirety.

FIELD

One or more aspects according to the present disclosure relate to network operations, and more particularly to a system and method for protection of authoritative name servers.

BACKGROUND

In a network, Domain Name Service (DNS) queries may be handled by one or more resolvers and one or more authoritative name servers. If a DNS distributed denial of service attack is launched against the network, it may degrade the performance of the authoritative name servers.

It is with respect to this general technical environment that aspects of the present disclosure are related.

SUMMARY

Systems and methods for protection of authoritative name servers are provided. In an aspect, a method includes receiving a first domain name service (DNS) query for a first domain; determining that the first domain is within a first group of domains, each domain of the first group being a sub-domain of a second domain; determining that the first domain does not exist; in response to determining that the first domain does not exist, transitioning a first DNS resolver to a partially disabled state, for the first group; receiving, in the partially disabled state, a second DNS query, for a third domain; determining that the third domain is within the first group; and treating, based on determining that the third domain is in within the first group, the third domain as unavailable in responding to the second DNS query.

In another aspect, a system includes a processing circuit; and one or more memories, operatively connected to the processing circuit and storing instructions that, when executed by the processing circuit, cause the system to perform a method. In examples, the method comprises: receiving a first domain name service (DNS) query for a first domain; determining that the first domain is within a first group of domains, each domain of the first group being a sub-domain of a second domain; determining that the first domain does not exist; in response to determining that the first domain does not exist, transitioning a first DNS resolver to a partially disabled state, for the first group; receiving, in the partially disabled state, a second DNS query, for a third domain; determining that the third domain is within the first group; and treating, based on determining that the third domain is in within the first group, the third domain as unavailable in responding to the second DNS query.

In another aspect, a system includes: a domain name service (DNS) resolver, and an authoritative name server. In examples, the DNS resolver is configured to: receive a first DNS query for a first domain; determine that the first domain is within a first group of domains, each domain of the first group being a sub-domain of a second domain; determine that the first domain does not exist; in response to determining that the first domain does not exist, transition to a partially disabled state, for the first group; receive, in the partially disabled state, a second DNS query, for a third domain; determine that the third domain is within the first group; and treat, based on determining that the third domain is in within the first group, the third domain as unavailable in responding to the second DNS query.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

These and other features and advantages of the present disclosure will be appreciated and understood with reference to the specification, claims, and appended drawings wherein:

FIG. 2A is a flow chart of first portion of a method, according to an example of the present disclosure;

DETAILED DESCRIPTION

The detailed description set forth below in connection with the appended drawings is intended as a description of exemplary embodiments of a system and method for protection of authoritative name servers provided in accordance with the present disclosure and is not intended to represent the only forms in which the present disclosure may be constructed or utilized. The description sets forth the features of the present disclosure in connection with the illustrated examples. It is to be understood, however, that the same or equivalent functions and structures may be accomplished by different examples that are also intended to be encompassed within the scope of the disclosure. As denoted elsewhere herein, like element numbers are intended to indicate like elements or features.

Figure 1A:
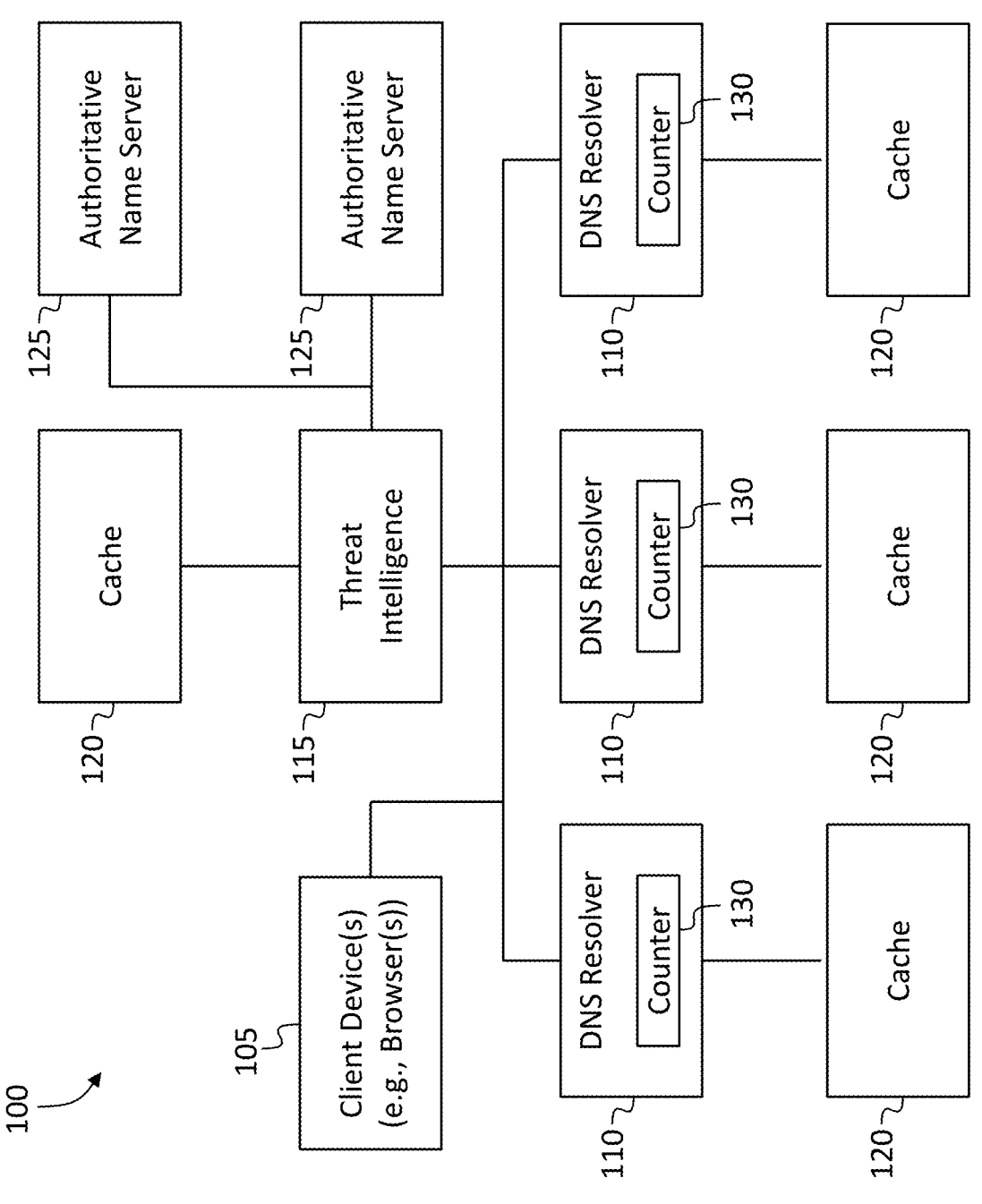
FIG. 1A is a block diagram of a network, according to an example of the present disclosure.

Referring to FIG. 1A, in some embodiments, one or more client devices 105, one or more DNS resolvers 110, a threat intelligence system 115, one or more cache(s) 120, and one or more authoritative name servers 125 may be connected together in a network 100. In some examples, some or all of the elements shown may be connected or configured differently; for example, each of the elements may be connected to each other element via an Ethernet, wireless, or other network, and the DNS resolvers 110 may include one or more levels of hierarchy. In operation, client devices 105 may send DNS queries to the DNS resolvers 110, e.g., via browsers on the client devices 105. When a resolver 110 receives a DNS query for a domain name, it may obtain an Internet Protocol (IP) address corresponding to the domain name and send it (along with a NOERROR response code) to the requesting client device 105.

In some examples, the resolver 110 may retrieve the corresponding IP address from its cached 120. If the resolver 110 does not have the IP address (e.g., stored in a cache 120) then it may submit a query to an authoritative name server 125 (e.g., to the authoritative name server 125 responsible for a domain of which the requested domain is a subdomain), and, if the authoritative name server 125 responds with the requested IP address, the resolver 110 may (i) send the IP address (along with a NOERROR response code) to the client device 105, and (ii) cache the domain name, along with the corresponding IP address. Cached IP addresses may each have a set time to live (TTL) (e.g., 20 minutes), which, once expired, may cause the cached IP address to be deleted from the cache 120 or invalidated. The resolver 110 may, depending on its configuration, occasionally perform a prefetch for a cached domain name, by querying the authoritative name server 125 to determine whether the IP address remains valid for the domain name; if it does remain valid, the time to live may be reset, prolonging the entry's valid storage in the cache 120.

If the authoritative name server 125 determines that a domain name for which a DNS query has been received does not exist, it may respond with an NXDOMAIN response code. The resolver 110 may then (i) send the NXDOMAIN response code to the client device 105 that submitted the DNS query, and (ii) cache the domain name in a list that may be referred to as a negative cache, used to store domain names known to the resolver 110 to be invalid. Each entry in the negative cache may also have a time to live (which may be shorter (e.g., 5 minutes) than the time to live of valid entries in the cache—e.g., IP addresses corresponding to found domain names). In examples, the cache 120 may include two separate caches, one positive and one negative, or the cache 120 may be one cache that stores entries that are tagged as either positive or negative.

In one example, a DNS Distributed Denial of Service (DDoS) (or "water torture") attack on a network may involve the sending of a large volume of DNS queries (which may be referred to as "malicious" DNS queries) by a plurality of compromised client devices 105, for subdomains of a particular domain. The subdomains requested may be generated, for example, by prepending pseudorandom strings, as the next lower level domain name, to the name of the domain being attacked. DNS resolvers 110 receiving such requests may forward them to the authoritative name server 125, burdening the authoritative name server 125, which may result in a degradation of the service provided by the authoritative name server 125.

In some examples, such attacks may be mitigated by a system such as that illustrated in FIG. 1. During an attack, a resolver 110 may receive, from client devices 105, a mixture of legitimate and malicious DNS queries. The network 100 may be configured (i) to detect a DNS DDOS attack, (ii) to take measures to mitigate such an attack and (iii) to return to normal operation either after some period of time or once it is determined that the attack has ceased.

To detect a DNS DDOS attack, the system 100 may monitor DNS queries submitted by the client devices 105 and the responses generated by the authoritative name server 125. For example, if the authoritative name server 125 begins to return a larger proportion of NXDOMAIN responses (responses indicating that the requested domain does not exist) than it returns in normal operation, the increase may be an indication of a DNS DDOS attack. As such, the system 100 may maintain a first counter 130 that is incremented whenever the authoritative name server 125 returns NXDOMAIN and that is decremented whenever the authoritative name server 125 returns a valid response (e.g., with the authoritative name server 125 returning a DNS response code of NOERROR and/or an IP address corresponding to the domain). The value of the first counter 130 may periodically be reset, or it may periodically be multiplied by a number less than 1, so that, for example, the effect of an NXDOMAIN response does not persist indefinitely. The amounts by which the first counter 130 is incremented or decremented respectively may be selected such that in normal circumstances (when a DNS DDOS attack is not in progress), the value of the first counter 130 is generally near zero (or some other number reflective of a non-attack condition).

The value of the first counter 130 may then be an indication of the proportion of valid DNS queries and of potentially malicious DNS queries. As such, when the value of the first counter 130 exceeds a first threshold it may be used as an indication that a DNS DDOS attack is in progress, and the system 100 may transition to a partially disabled state, in which certain DNS queries are handled in a manner that reduces the burden on the authoritative name server 125. The first counter 130 may store an integer value, or a floating-point value, or a fixed-point value (the storing of which may be equivalent to the storing of an integer).

As used herein "incrementing" a counter means changing (e.g., increasing or decreasing) the value of the counter and "decrementing" the counter means changing the counter in the opposite direction from that of "incrementing." As used herein, when a counter "exceeds a threshold" it means that the value of the counter has changed, in the direction that incrementing the counter changes the counter, so as to pass the threshold. For example, if incrementing the counter decreases the value of the counter, then "exceeding the threshold" means falling below the threshold. As used herein, when a counter "falls below a threshold" it means that the value of the counter has changed, in the direction that decrementing the counter changes the counter, so as to pass the threshold.

For purposes of determining whether a DNS DDOS attack is taking place and for mitigating such an attack, the set of domains may be divided into groups. Each group may include, e.g., all subdomains of a second-level domain, or a subset of the subdomains of a second-level domain. Using example.com as an example of a second-level domain name, a group may include all subdomains of the second-level domain example.com, or the second level domain example-.com may be further subdivided. For example, the subdomains of the second level domain example.com may be divided into groups according to the first character of the domain name, with, e.g., all names beginning with "a" (or, equivalently, "A", domain names being case-insensitive) being part of a first group, all names beginning with "b" being part of a second group, and so forth.

A separate first counter 130 may be set up for each such group, and transitions to the partially disabled state may be made on a per-group basis. In such an example, the grouping may be based on (i) the first character of the second level domain name, or (ii) the first character of the full domain name (i.e., the first character of the lowest-level sub-domain). In some examples the grouping is based on the first character of the domain name and the length of the domain name. In some examples, each domain name is hashed and assigned to a group based on which of a set of sub-ranges (of the range of possible hashed values) the hashed value falls into. In examples, the number of groups may be selected such that (i) the set of domains affected by the transition to the partially disabled state, when such a transition occurs, is not excessively large and (ii) the groups are not so small that only an unusually high-volume DNS DDOS attack would trigger a transition to the partially disabled state.

Figure 1B:
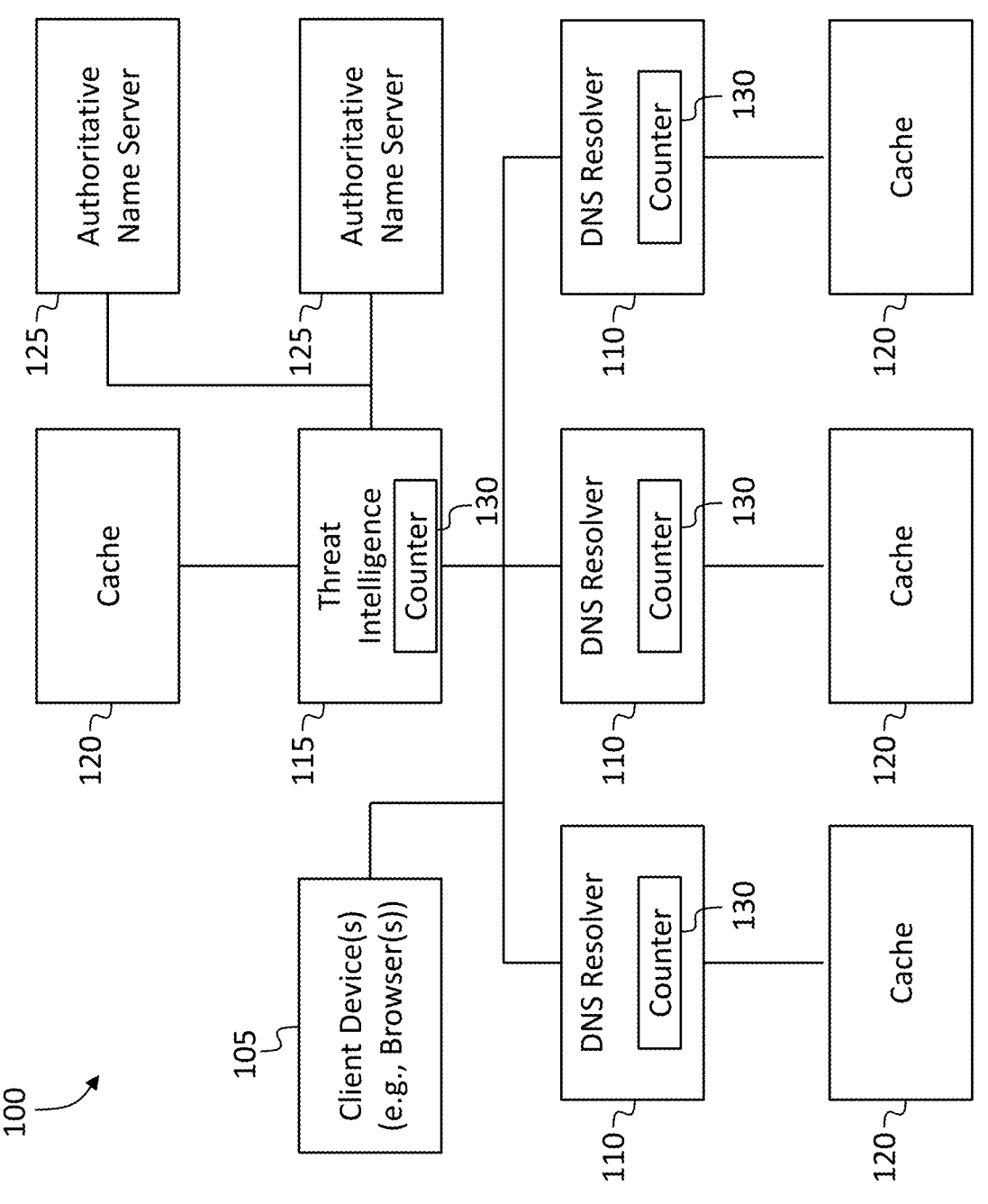
FIG. 1B is a block diagram of a network, according to an example of the present disclosure.

The first counter 130 (for each group of domains) may be implemented in, and maintained by, the threat intelligence system 115. In such an implementation, the threat intelligence system 115 may monitor valid responses and NXDO-MAIN responses returned by each resolver 110 and incre-ment and decrement the first counter 130 accordingly. In other examples, each resolver 110 may maintain a respective first counter 130 for each group of domains. In some examples, as illustrated in FIG. 1B, each of the resolvers 110 has a respective counter 130 and each resolver 110 reports its count to the threat intelligence system 115, which main-tains a global counter 130. The individual resolvers 110 may be programmed to trigger threat mitigation procedures (e.g., a transition to the partially disabled state) when either (i) the individual resolver's count exceeds the threshold; or (ii) the threat intelligence indicates that a global threshold has been exceeded (so all resolvers 110 (or all the resolvers in a particular region or portion of a network) are triggered).

When a resolver 110 is operating in a partially disabled state for a domain group, it may treat some or all of the domains in the domain group as unavailable in responding to DNS queries. For example, if the resolver receives a DNS query for a domain that is in the group and that is not cached, it may treat the domain as unavailable by refraining from forwarding the DNS query to the authoritative name server 125 and (i) responding to the DNS query with a response indicating that an Internet Protocol address for the domain is not available (e.g., a response including a SERVFAIL response code, notifying the client that the resolver 110 is unable to return an IP address for the domain), or (ii) not responding to the DNS query. Operating in this manner may entirely shield the authoritative name server 125 from mali-cious DNS queries for the group, while allowing the system to operate normally for other groups and for other second-level domains.

In some examples, each resolver 110 may perform several steps as part of the process of transitioning to the partially disabled state. For example, each resolver 110 may perform a prefetch for each cached domain name, to update its cache of domain names, and it may also update its negative cache. To update its cache of valid domain names, each resolver 110 may send a query to the authoritative name server 125 for each domain name saved in its cache, and (i) delete (or mark for deletion) from its cache any domain name/IP address pairs that are no longer valid, and (ii) reset the time to live (TTL) of any domain names that remain valid. Each resolver 110 may also update its negative cache by sending a query to the authoritative name server 125 for each domain name saved in the negative cache, and (i) deleting (or marking for deletion) from its cache any domain names that are no longer identified, by the authoritative name server 125, as nonexistent, and (ii) resetting the time to live (TTL) of any domain names that are still identified, by the authori-tative name server 125, as nonexistent.

In some examples, when transitioning to the partially disabled state, the states and the caches of two or more resolvers 110 may also be synchronized, so that when one resolver 110 transitions to the partially disabled state for a group, multiple (or all) of the resolvers 110 transition to the partially disabled state for that group, and so that multiple (or all) of the resolvers 110 remain able to respond, with an IP address, to queries for cached domains. In some examples, the threat intelligence system 115 may make the decision, for all of the resolvers 110, when to transition to the partially disabled state and when to transition back to the normal state. The transition may be triggered when the counter 130 of any individual resolver 110 exceeds a thresh-old or when a global threshold is exceeded (where the individual resolvers 110 report counter values to the threat intelligence system 115). The threat intelligence system 115 may also collect, during a transition to the partially disabled state, the cached domain names from the resolvers 110 and send the full set of valid domain names (and the correspond-ing IP addresses) to the resolvers 110. In some examples, the threat intelligence system 115 instructs each resolver 110 (i) to obtain cache information from each other resolver 110, and (ii) to update its cache with this information.

In the partially disabled state, the resolvers 110 may occasionally, when one or more criteria are met, make exceptions to the policy of not forwarding queries for domains in the group to the authoritative name server 125. For example, the resolvers 110 may forward some (e.g., a small fraction) of the DNS queries, in the group, for which no IP address is cached, to the authoritative name server 125. The DNS queries that are forwarded may be selected at random from the received DNS queries (e.g., each domain name may be hashed, and if the result exceeds a certain value, the query may be forwarded), or they may be selected based on an artificial intelligence or machine learning model. In other examples, the forwarded queries may be selected based on, for example, the number of times a client has resubmitted the query (the query being selected, for example, if the client has resubmitted the query more than a certain number of times, e.g., more than twice). Each resolver 110 (or the threat intelligence circuit 115) may run a machine learning model, with parameters received, e.g., from a central modeling server. In some examples, the system 100 (and/or each individual resolver 110) transitions back to the normal state when a certain amount of time has elapsed since the transition to the partially disabled state, as discussed in further detail below; such a transition (which may be temporary, and followed by another transition to the partially disabled state, if the system is still under attack) may allow a number of legitimate DNS queries to be processed even if they are for un-cached domain names. Such mechanisms may help to avoid un-cached, but valid, domains in a group becoming entirely inaccessible to legiti-mate clients.

During operation in the partially disabled state, a second counter may be, e.g., decremented whenever a DNS query for a cached domain is received, and incremented (i) when-ever any other DNS query is received or (ii) whenever a DNS query for a domain in the negative cache is received. The amounts by which the second counter is incremented or decremented may be the same as the corresponding amounts when operating in normal mode, or the amounts may be adjusted to account, for example, for the possibility that a relatively small fraction of the existing domains may be cached. The system may then assess, continuously or peri-odically, whether the attack has ceased by comparing the value of the second counter to a second threshold. The amounts by which the second counter is respectively incre-mented and decremented may be selected such that in normal operation, the second counter value is generally near zero. To prevent, for example, amounts accumulated in the second counter as a result of malicious queries received from affecting the value of the second counter indefinitely, the second counter may periodically be reset to zero or to a value just exceeding the second threshold, or the second counter may periodically be multiplied by a value less than one.

After transitioning to the partially disabled state, each resolver 110 may eventually transition back to a normal state, in which the authoritative name server 125 may be queried by the resolver 110, for each DNS query for an un-cached domain. The transition back to the normal state may be triggered, for example, (i) by a certain amount of time (e.g., between 5 and 60 minutes, e.g., 20 minutes) having elapsed since the transition to the partially disabled state, or (ii) by the second counter being decremented past the second threshold or (iii) by some combination of these conditions, e.g., by a certain time interval having elapsed during which the second counter remained below the second threshold. In some examples the second counter is the same counter as the first counter 130; in some examples they are separate counters.

In some examples, the information generated or maintained by the threat intelligence system 115 may be shared with other networks (e.g., by publishing the information in a manner that makes it available to other networks subscribing to such information). Such an information-sharing arrangement may make it possible to block an attack more broadly.

Figure 2B:
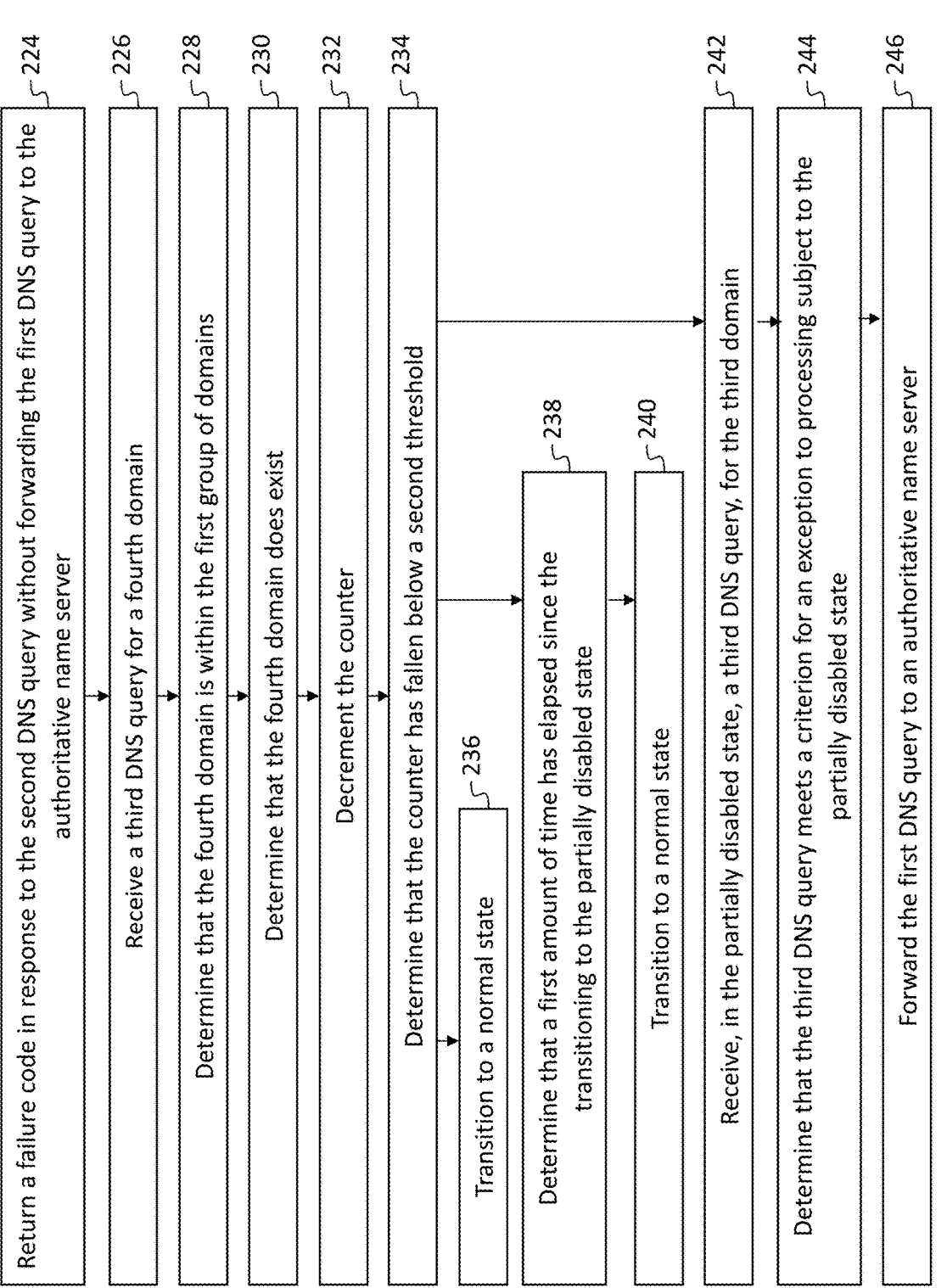
FIG. 2B is a flow chart of second portion of the method of FIG. 2A, according to an example of the present disclosure.

FIGS. 2A and 2B are a flowchart of a method, according to some examples. In some examples, the operations of FIGS. 2A and 2B may be performed by one or more resolver, such as resolvers 110 in FIG. 1A. The method includes, at 200, receiving a first domain name service (DNS) query for a first domain; and determining, at 202, that the first domain is within a first group of domains, each domain of the first group being a sub-domain of a second domain. In examples, "determining that the first domain is within a first group of domains" comprises parsing the query to determine a recited subdomain and the next-level-up domain also recited in the query. For example, a resolver receiving a legitimate query for name.example.com and another, illegitimate query for #XRW$.example.com may "determine" that both "name" and "#XRW$" are subdomains in a group of example.com subdomains based on a parsing of the queries, even though the #XRW$.example.com domain does not actually exist.

Flow proceeds to operation 204, where the first DNS query is forwarded to an authoritative name server. For example, if a resolver does not have an IP address for the requested domain cached, it may forward the request to the responsible authoritative server. Flow proceeds to operation 206, where an NXDOMAIN response code is received from the authoritative name server. At operation 208, in response to receiving the NXDOMAIN response code, it is determined that the first domain does not exist. For instance, in the example above, if the first domain was #XRW$.example.com, the authoritative server may respond with the NXDOMAIN response code.

The method may further include, in response to determining that the first domain does not exist, and in response to determining that a counter (e.g., the first counter 130) has exceeded a threshold, transitioning, at 210, to a partially disabled state, for the first group. For example, one or more resolver may transition to a partially disabled state for all subdomains of example.com. Flow proceeds to operation 212, where a first DNS resolver may request, from a second DNS resolver, a list of valid domains in the first group and a list of corresponding IP addresses. The first DNS resolver may also update, at 214, a cache of valid domains.

The method may further include, in response to determining that the first domain does not exist, incrementing, at

216, a counter associated with the first group. The method may further include receiving, at 218, in the partially disabled state, a second DNS query, for a third domain; determining, at 220, that the third domain is within the first group; and treating, at 222, based on determining that the third domain is in within the first group, the third domain as unavailable in responding to the second DNS query. The treating, at 222, the third domain as unavailable may include returning, at 224 (FIG. 2B) a failure code in response to the second DNS query without forwarding the first DNS query to the authoritative name server.

The method may further include receiving, at 226, a third DNS query for a fourth domain; determining, at 228, that the fourth domain is within the first group of domains; determining, at 230, that the fourth domain does exist; in response to determining that the fourth domain does exist, decrementing the counter, at 232; determining, at 234, that the counter has fallen below a second threshold, and, in response to determining that the counter has fallen below the second threshold, transitioning, at 236, to a normal state.

The method may further include determining, at 238, that a first amount of time has elapsed since the transitioning to the partially disabled state; and, in response to determining that a first amount of time has elapsed since the transitioning to the partially disabled state, transitioning, at 240, to a normal state. In some examples, operations 238 and 240 may occur regardless of the state of the counter. In other words, in some examples, the expiration of a time period may, alone, be enough to cause a transition back to a normal state. In other examples, the transition may occur as a result of both a timer expiration and a counter threshold being reached.

In additional examples, the method may further include receiving, at 242, in the partially disabled state, a third DNS query, for the third domain; determining, at 244, that the third DNS query meets a criterion for an exception to processing subject to the partially disabled state; and forwarding, at 246, the first DNS query to an authoritative name server. As discussed, the resolvers may forward some (e.g., a small fraction) of the DNS queries, in the group, for which no IP address is cached, to the authoritative name server. The DNS queries that are forwarded may be selected at random from the received DNS queries (e.g., each domain name may be hashed, and if the result exceeds a certain value, the query may be forwarded), or they may be selected based on an artificial intelligence or machine learning model. In other examples, the forwarded queries may be selected based on, for example, the number of times a client has resubmitted the query (the query being selected, for example, if the client has resubmitted the query more than a certain number of times, e.g., more than twice). Other examples of determining exceptions are possible and contemplated.

Figure 2C:
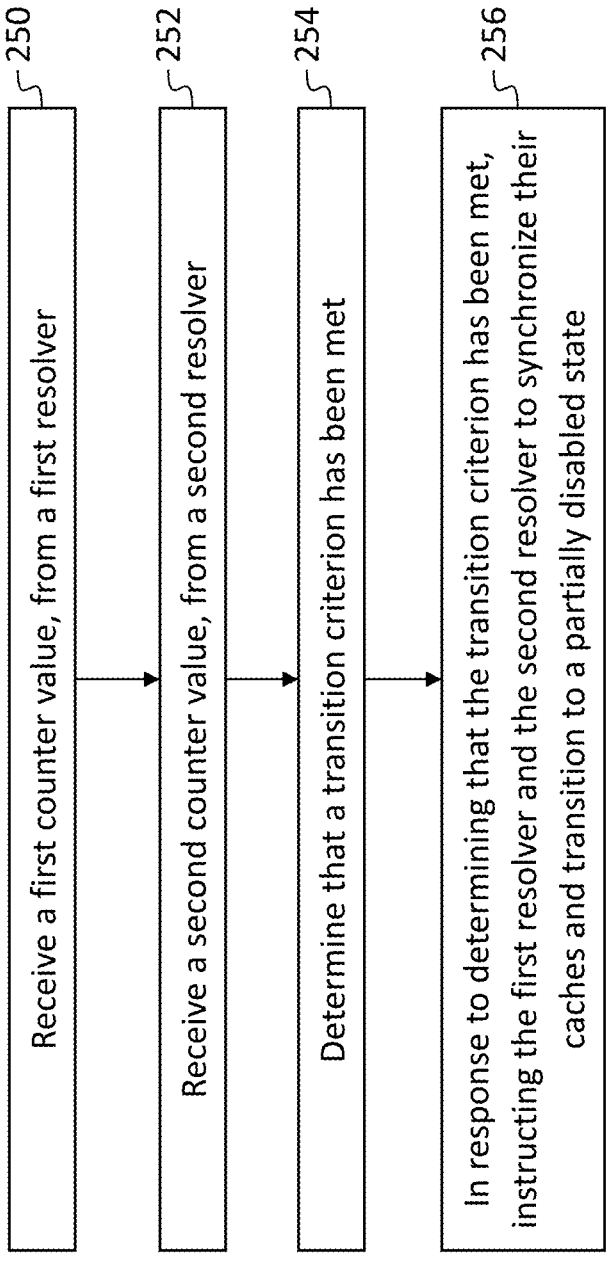
FIG. 2C is a flow chart of a method, according to an example of the present disclosure.

FIG. 2C is a flowchart of a method, according to some examples, in which a threat intelligence system 115 coordinates the transition to the partially disabled state for a plurality of resolvers 110. At 250, the threat intelligence system 115 receives a first counter value from a first resolver 110, and at 252, the threat intelligence system 115 receives a second counter value, from a second resolver 110. The threat intelligence system 115 may then, at 254, determine, based on the first counter value and the second counter value (e.g., by determining that a sum of received counter values, including the first counter value and the second counter value, exceeds a threshold) that a transition criterion (e.g., the sum of the counter values exceeding a threshold) has been met. At 256, based on determining that the transition criterion has been met, the threat intelligence system 115 may coordinate a transition to the partially disabled state, for example by instructing the first resolver and the second resolver to synchronize their caches and transition to a partially disabled state for a first group of domains.

Figure 3:
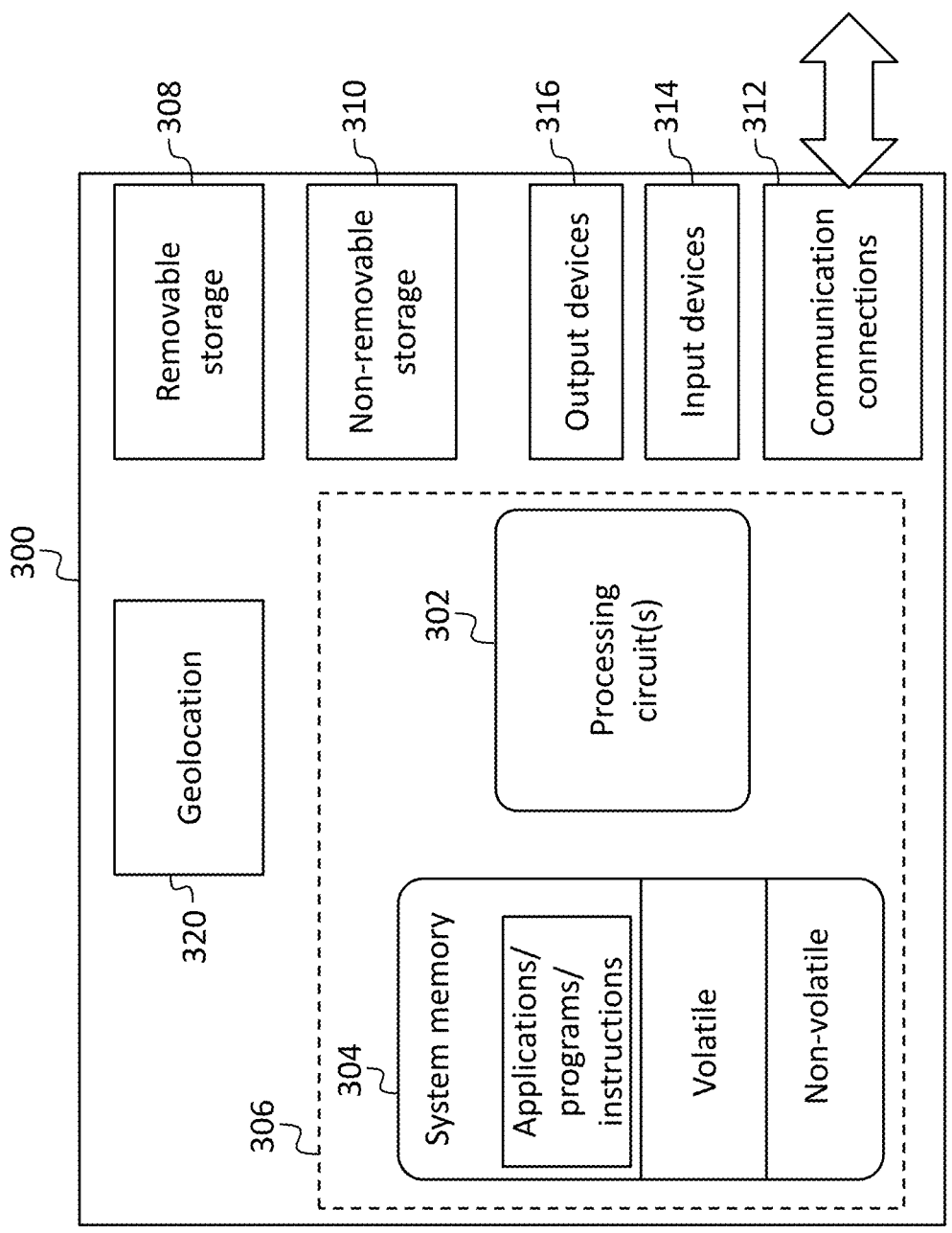
FIG. 3 is a block diagram of an operating environment, according to an example of the present disclosure.

FIG. 3 depicts an example of a suitable operating environment 300, portions of which may be used to implement the client devices 105, the resolvers 110, threat intelligence system 115, the authoritative name server 125, or other computing devices within the systems discussed herein. In its most basic configuration, operating environment 300 typically includes at least one processing circuit 302 and memory 304. The processing circuit may be a processor, which is hardware. Depending on the exact configuration and type of computing device, memory 304 (storing instructions to perform the methods disclosed herein) may be volatile (such as RAM), non-volatile (such as ROM, flash memory, etc.), or some combination of the two. This most basic configuration is illustrated in FIG. 3 by dashed line 306. The memory 304 stores instructions that, when executed by the processing circuit(s) 302, perform the processes and operations described herein. Further, environment 300 may also include storage (removable 308, or non-removable 310) including, but not limited to, solid-state, magnetic disks, optical disks, or tape. Similarly, environment 300 may also have input device(s) 314 such as keyboard, mouse, pen, voice input, etc., or output device(s) 316 such as a display, speakers, printer, etc. Additional communication connections 312 may also be included that allow for further communication with LAN, WAN, point-to-point, etc. Operating environment 300 may also include geolocation devices 320, such as a global positioning system (GPS) device.

Operating environment 300 typically includes at least some form of computer readable media. Computer readable media can be any available media that can be accessed by processing circuit 302 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of any of the above should also be included within the scope of computer readable media.

Although some examples are described herein in the context of a WiFi network, the present disclosure is not limited to such a network and, for example, the systems and methods described herein may be employed to similar or identical effect in other wireless or wired networks. As used herein, the word "or" is inclusive, so that, for example, "A or B" means any one of (i) A, (ii) B, and (iii) A and B. As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity. As used herein, when an action is performed "in response to" an event or condition, the event or condition may or may not be necessary to trigger the performance of the action and the event or condition may or may not be sufficient to trigger the performance of the action. For example, if the occurrence of a first event and a second event triggers the performance of an action, it may be said that the action is performed in response to the first event and that it is further performed in response to the second event.

The terms "domain" and "domain name" are used interchangeably herein, each meaning a sub-domain of a top-level domain, or the name of such a sub-domain. As used herein, an "immediate subdomain" of a domain is one that is one level lower than the domain. For example, the third-level domain "name.example.com" is an immediate subdomain of the second-level domain "example.com" and "page1.name.example.com" is not an immediate subdomain of "example.com".

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Although exemplary embodiments of a system and method for protection of authoritative name servers have been specifically described and illustrated herein, many modifications and variations will be apparent to those skilled in the art. Accordingly, it is to be understood that a system and method for protection of authoritative name servers constructed according to principles of this disclosure may be embodied other than as specifically described herein. The invention is also defined in the following claims, and equivalents thereof.

What is claimed is:

1. A method, comprising:
receiving a first domain name service (DNS) query for a first domain;

determining that the first domain is within a first group of domains, each domain of the first group being a sub-domain of a second domain;

determining that the first domain does not exist;

in response to determining that the first domain does not exist, transitioning a first DNS resolver to a partially disabled state, for the first group;

receiving, in the partially disabled state, a second DNS query, for a third domain;

determining that the third domain is within the first group; and treating, based on determining that the third domain is in within the first group, the third domain as unavailable in responding to the second DNS query, wherein the first group is one of a set of groups of domains, the set of groups encompassing all sub-domains of the second domain, the set of groups including at least five groups and no more than 1000 groups.

2. The method of claim 1, wherein the second domain is a second-level domain.

3. The method of claim 1, further comprising, in response to determining that the first domain does not exist, incre-menting a counter associated with the first group, wherein the transitioning to a partially disabled state is further in response to determining that the counter has exceeded a threshold.

4. The method of claim 3, further comprising:

receiving a third DNS query for a fourth domain;

determining that the fourth domain is within the first group of domains;

determining that the fourth domain does exist; and in response to determining that the fourth domain does exist, decrementing the counter.

5. The method of claim 3, further comprising:

determining that the counter has fallen below a second threshold, and in response to determining that the counter has fallen below the second threshold, transitioning to a normal state.

6. The method of claim 1, further comprising:

determining that a first amount of time has elapsed since the transitioning to the partially disabled state; and in response to determining that a first amount of time has elapsed since the transitioning to the partially disabled state, transitioning to a normal state.

7. The method of claim 1, further comprising, in response to determining that the first domain does not exist, updating a cache of valid domains.

8. The method of claim 7, wherein the updating of the cache of valid domains comprises requesting, by the first DNS resolver, from a second DNS resolver, a list of valid domains in the first group and a list of corresponding IP addresses.

9. The method of claim 1, wherein the determining that the first domain does not exist comprises determining, by the first DNS resolver, that the first domain is in a list, cached in the first DNS resolver, of domains that do not exist.

10. The method of claim 1, wherein the determining that the first domain does not exist comprises:

forwarding the first DNS query to an authoritative name server; and receiving, from the authoritative name server, an NXDO-MAIN response code;

wherein treating the third domain as unavailable com-prises returning a failure code in response to the second DNS query without forwarding the first DNS query to the authoritative name server.

11. The method of claim 1, wherein treating the third domain as nonexistent comprises returning a response to the second DNS query indicating that an Internet Protocol address for the third domain is not available.

12. The method of claim 1, further comprising receiving, in the partially disabled state, a third DNS query, for the third domain;

determining that the third DNS query meets a criterion for an exception to processing subject to the partially disabled state; and forwarding the first DNS query to an authoritative name server.

13. A system, comprising:

a processing circuit; and one or more memories, operatively connected to the processing circuit and storing instructions that, when executed by the processing circuit, cause the system to perform a method, the method comprising:

receiving a first domain name service (DNS) query for a first domain;

determining that the first domain is within a first group of domains, each domain of the first group being a sub-domain of a second domain;

determining that the first domain does not exist;

in response to determining that the first domain does not exist, transitioning a first DNS resolver to a partially disabled state, for the first group;

receiving, in the partially disabled state, a second DNS query, for a third domain;

determining that the third domain is within the first group; and treating, based on determining that the third domain is in within the first group, the third domain as unavailable in responding to the second DNS query, wherein the first group is one of a set of groups of domains, the set of groups encompassing all sub-domains of the second domain, the set of groups including at least five groups and no more than 1000 groups.

14. The system of claim 13, wherein the second domain is a second-level domain.

15. The system of claim 13, further comprising, in response to determining that the first domain does not exist, incrementing a counter associated with the first group, wherein the transitioning to a partially disabled state is further in response to determining that the counter has exceeded a threshold.

16. The system of claim 15, further comprising:

receiving a third DNS query for a fourth domain;

determining that the fourth domain is within the first group of domains;

determining that the fourth domain does exist; and in response to determining that the fourth domain does exist, decrementing the counter.

17. The system of claim 15, further comprising:

determining that the counter has fallen below a second threshold, and in response to determining that the counter has fallen below the second threshold, transitioning to a normal state.

18. The method of claim 13, further comprising:

determining that a first amount of time has elapsed since the transitioning to the partially disabled state; and in response to determining that a first amount of time has elapsed since the transitioning to the partially disabled state, transitioning to a normal state.

19. A system, comprising:

a domain name service (DNS) resolver, and an authoritative name server, the DNS resolver being configured to:

receive a first DNS query for a first domain;

determine that the first domain is within a first group of domains, each domain of the first group being a sub-domain of a second domain;

determine that the first domain does not exist;

in response to determining that the first domain does not exist, transition to a partially disabled state, for the first group;

receive, in the partially disabled state, a second DNS query, for a third domain;

determine that the third domain is within the first group; and treat, based on determining that the third domain is in within the first group, the third domain as unavailable in responding to the second DNS query, wherein the first group is one of a set of groups of domains, the set of groups encompassing all sub-domains of the second domain, the set of groups including at least five groups and no more than 1000 groups.

\* \* \* \* \*